United States Patent
Ansley et al.

(10) Patent No.: US 9,544,912 B2
(45) Date of Patent: Jan. 10, 2017

(54) WIRELESS ACCESS POINT TRANSMISSION CONTROL

(71) Applicant: ARRIS Enterprises, Inc., Suwanee, GA (US)

(72) Inventors: Carol J. Ansley, Johns Creek, GA (US); Wade E. Carter, Johns Creek, GA (US); Angela Lyda, Atlanta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 134 days.

(21) Appl. No.: 14/567,366

(22) Filed: Dec. 11, 2014

(65) Prior Publication Data

US 2015/0173095 A1 Jun. 18, 2015

Related U.S. Application Data (60) Provisional application No. 61/915,502, filed on Dec. 12, 2013.

(51) Int. Cl.
*H04W 72/10* (2009.01)
*H04L 12/865* (2013.01)
*H04W 72/04* (2009.01)
*H04W 74/08* (2009.01)

(52) U.S. Cl.
CPC .......... *H04W 72/10* (2013.01); *H04L 47/6275* (2013.01); *H04W 72/0446* (2013.01); *H04W 74/0875* (2013.01)

(58) Field of Classification Search
CPC ... H04W 84/12; H04W 28/0289; H04L 47/14; H04L 41/0893; H04L 47/805; H04L 47/12
See application file for complete search history.

(56) References Cited

U.S. PATENT DOCUMENTS

| | | | |
|---|---|---|---|
| 2005/0025176 A1* | 2/2005 | Ko | H04W 74/085 370/448 |
| 2005/0271019 A1 | 12/2005 | Yuan et al. | |
| 2009/0323611 A1 | 12/2009 | Singh et al. | |
| 2010/0284380 A1* | 11/2010 | Banerjee | H04W 16/14 370/338 |
| 2011/0255618 A1 | 10/2011 | Zhu et al. | |
| 2013/0229995 A1* | 9/2013 | Cai | H04W 72/10 370/329 |

OTHER PUBLICATIONS

PCT Search Report & Written Opinion, RE: Application No. PCT/US2014/069857, dated Mar. 23, 2015.

* cited by examiner

*Primary Examiner* — Jung Park
(74) *Attorney, Agent, or Firm* — Bart A. Perkins (57) ABSTRACT

Methods, systems, and computer readable media can be operable to facilitate the management of access point transmissions based upon priority of traffic. An access point may periodically cycle between aggressive phases, during which the access point contends for downstream transmission opportunities aggressively, and background phases, during which the access point contends for downstream transmission opportunities passively. The access point may alternate between aggressive and background phases based upon a priority level of received packets, services, and/or clients. The access point may also alternate between aggressive and background phases based upon the congestion level and/or health of an associated network.

20 Claims, 4 Drawing Sheets

WIRELESS ACCESS POINT TRANSMISSION CONTROL

CROSS REFERENCE TO RELATED APPLICATION

This application is a non-provisional application claiming the benefit of U.S. Provisional Application Ser. No. 61/915,502, entitled "Wireless Access Point Transmission Control," which was filed on Dec. 12, 2013, and is incorporated herein by reference in its entirety.

TECHNICAL FIELD

This disclosure relates to managing transmission opportunities.

BACKGROUND

Use of wireless home networking has greatly increased in importance recently. The wireless world is more complex than the dependable wired connections that most networking is based upon. Wireless access point subsystems allow gateways and other similar devices to connect stations to a broadband backbone. Stations may include wireless clients such as mobile devices, laptops and other wireless devices. Wireless transmissions are typically uncontrolled (e.g., there is not a scheduling MAC native to Wi-Fi).

Each time a station or access point has data waiting for transmission, a Ready to Send, Clear to Send (CTS/RTS) sequence using carrier sense for collision detection can be used. The winner of a CTS/RTS sequence announces parameters of its transmission, including the length, and begins transmitting packets. The receiving station is allowed brief windows during the transmission to acknowledge each packet's transmission. By adjusting how aggressively a station or access point acts during the contention window, the station or access point can increase the probability of successfully seizing the air.

Currently, once a station receives a packet from an access point, the station enters a back-off period, within which the station is unable to initiate a new packet transmission. At the end of a back-off period, the station may then be able to initiate a new packet transmission to the access point. Currently, the back-off periods for an access point and stations are randomly set within certain windows.

It is desirable to improve upon control of downstream and upstream transmission opportunities in wireless home networking. Current forms of transmission opportunity control can preclude a system from being able to guarantee that the transmissions will be fairly distributed among competing stations, and there is a possibility that upstream transmissions could starve out downstream transmissions.

BRIEF DESCRIPTION OF DRAWINGS

Like reference numbers and designations in the various drawings indicate like elements.

DETAILED DESCRIPTION

Described herein is a method and system for a new scheduling block for home networking quality of service. Access points and client devices served by the access points interact with each other in a complex way when contending for transmission opportunities. Parameters that govern the contention interactions can be set so that a station or access point can grab airtime before the other stations. To allow an access point to control the time allocated for downstream transmissions, which typically constitute the majority of the bandwidth on a wireless link, contention parameters can be used cyclically to ensure that the access point can receive an amount of transmission time with little to no competition from other devices. The access point can then back off and use less aggressive contention parameters to allow the other stations time to communicate back upstream.

Methods, systems, and computer readable media can be operable to facilitate the management of access point transmissions based upon priority of traffic. An access point may periodically cycle between aggressive phases, during which the access point contends for transmission opportunities aggressively, and background phases, during which the access point contends for transmission opportunities passively. The access point may alternate between aggressive and background phases based upon a priority level of received packets, services, and/or stations. The access point may also alternate between aggressive and background phases based upon the congestion level and/or health of an associated network.

Control of downstream and upstream bandwidth distribution can be exerted by carefully selecting access point backoff time constants. A wireless scheduler can periodically cycle the access point's backoff setting between an aggressive setting (e.g., similar to the Wi-Fi MultiMedia (WMM) Video setting), thereby allowing the access point a better chance of seizing the air, and a background setting (e.g., similar to the WMM background setting), thereby allowing other devices a better chance to seize the air. Using a background setting ensures that if the stations do not have traffic to transmit, then the access point can still step in to utilize the transmission time if it still has more traffic waiting to be sent.

In embodiments, an access point can enter into an aggressive phase when the access point receives high priority traffic. High priority traffic may include video traffic that is sensitive to jitter and latency. High priority traffic may also include traffic that is targeted at a prioritized station or end-user (e.g., subscriber traffic versus hot spot traffic when a single access point is supporting both service types. Received traffic may be identified as high priority traffic based upon parameters such as a target station's device type or service profile. An access point can also consider packet markings or other information inherent in the packet stream to associate that traffic with high priority treatment.

When operating in the aggressive phase, the access point may output packets to one or more stations based upon high priority contention parameters (e.g., settings controlling a device's contention for transmission opportunities). The access point may use a predetermined back-off that is associated with the high priority packets. For example, the back-off may be shorter than the back-off that would otherwise be used if randomly selected. By reducing the back-off, the access point can control more transmission opportunities for transmitting the high priority packets by winning the associated contention protocol more often.

In embodiments, the access point can enter into a background phase when the access point is not receiving high priority traffic. The access point can enter into the background phase periodically to allow one or more stations the opportunity to transmit upstream communications. The background phase may provide the one or more stations with an opportunity to win an associated transmission contention window.

When operating in the background phase, the access point may output packets to one or more stations based upon background contention parameters. The access point may use a predetermined back-off such that the one or more stations have a better chance to successfully contend for transmission opportunities. For example, the predetermined back-off may be longer than a back-off that would otherwise be used if randomly selected (e.g., back-off randomly selected according to a standard back-off determination). The predetermined back-off may be set high enough so that the one or more stations have an improved opportunity to contend for transmission opportunities versus the access point, but low enough so that the access point can seize transmission opportunities during periods of low traffic flow.

Figure 1:
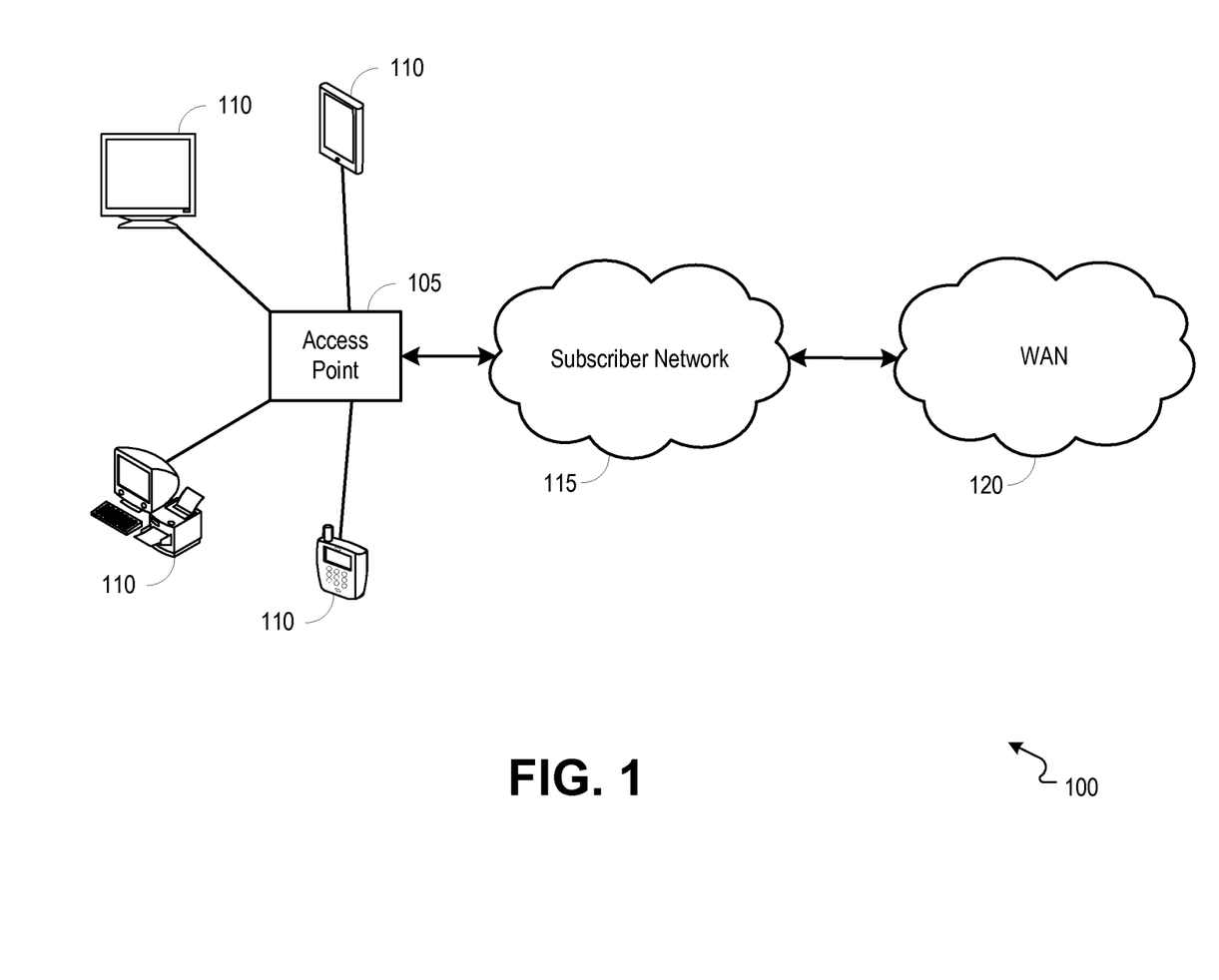
FIG. 1 is a block diagram illustrating an example network environment operable to facilitate the management of access point transmissions.

FIG. 1 is a block diagram illustrating an example network environment 100 operable to facilitate the management of access point transmissions based upon priority of traffic. In embodiments, an access point 105 may support communications between one or more stations 110 (e.g., set-top box (STB), television, computer, tablet, mobile device and any other device operable to receive services) and a subscriber network 115 (e.g., a local area network (LAN), a wireless local area network (WLAN), a personal area network (PAN), optical network, hybrid fiber coaxial network, mobile network, etc.). The access point 105 may provide video, voice, and/or data services to a subscriber by communicating with a wide area network (WAN) 120 through a connection to the subscriber network 115. For example, a subscriber can receive and request video, voice, and/or data services through a station 110 via a connection between the station 110 and access point 105.

In embodiments, an access point 105 may facilitate the transmission and routing of both upstream and downstream communications. Upstream communications may include communications received by the access point 105 from a station 110, and the communications may be designated for transmission to an upstream network component (e.g., network headend, content/service provider server, etc.). Downstream communications may include communications received by the access point 105 from the subscriber network 115, and the communications may be designated for transmission to a station 110. Services requested at a station 110 may be received at an access point 105 as downstream communications, thus downstream communications can make up the majority of communications received at an access point 105.

In embodiments, various contention parameters may be used at an access point 105 to control upstream and downstream transmissions. For example, a wireless link between the access point 105 and one or more stations 110 may be designated for transmitting downstream communications to stations 110 and upstream communications to the access point 105. Contention parameters may cause a greater amount of transmission time to be allocated to transmitting downstream communications to stations 110 where downstream communications make up the majority of communications received at the access point 105.

Transmission opportunities may be controlled at an access point 105 using backoff settings. After a transmission is made along a link connecting the access point 105 to one or more stations 110, the device making the transmission can enter into a backoff period. A backoff period may be a predetermined and/or varying period of time during which a device refrains from attempting to output a communication. The backoff period may be a single value or a range of values (e.g., 0-15), and a number selected from within the range of values can represent a number of contention transmission opportunities that the device must defer before making a subsequent transmission attempt. In embodiments, a lower backoff value can result in more frequent transmission attempts while a larger backoff value can result in less frequent transmission attempts.

In embodiments, a backoff period may be controlled by the length of an arbitration interframe space (AIFS) associated with a device. An AIFS may define a period of time the device must wait before being allowed to transmit a next frame. When high priority traffic is received at the access point, a shorter AIFS can be used such that the traffic has a higher probability of being transmitted from the device with lower latency. When lower priority traffic is received at the access point, a longer AIFS can be used at the access point.

In embodiments, backoff periods at an access point 105 may be configured such that a shorter backoff period is used when the access point 105 is transmitting high priority downstream communications (e.g., live video) and/or when the access point 105 has queued high priority downstream communications for transmitting. For example, when high priority traffic is received at an access point, a low backoff duration setting can be selected, thus the access point will defer fewer contention transmission opportunities and the high priority traffic may be output from the access point to one or more stations at a higher rate. When lower priority traffic is received at the access point, a high backoff duration setting can be selected, thus the access point will defer a greater number of contention transmission opportunities and the low priority traffic may be output from the access point to one or more stations at a slower rate. It should be understood that a determination as to the priority of traffic can be based upon an analysis of traffic received at an access point, traffic queued at the access point, and/or traffic output from the access point, either separately or in combination.

In embodiments, the access point 105 can allocate transmission time between aggressive phases and background phases, during which aggressive transmission attempts and background transmission attempts are made respectively. During an aggressive phase, the access point 105 can use high priority (e.g., 'Video') contention parameters which permit the access point 105 to use a short backoff duration after a transmission. The high priority contention parameters may allow the access point 105 to win the contention protocol at least a majority of the time. For example, the access point 105 may receive more transmission opportunities than other devices (e.g., stations 110) that are competing with the access point 105 for transmission opportunities.

During a background phase, the access point 105 may use lower-priority (e.g., 'Background') contention parameters. During the background phase, the access point 105 can use a longer backoff duration after a transmission. The longer backoff duration may allow other devices (e.g., stations 110) to capture transmission opportunities for upstream transmissions more often. If it seizes the air too much, the other clients that are following the WiFI standard will have very long wait times and may not come in at all between access point transmissions. In embodiments, the access point can contend for transmission opportunities during the background periods, so that if there is not any substantive traffic from other sources, it can continue to make efficient use of the airtime.

As operators deploy various services, some clients may require favored treatment. Some examples of clients requiring priority treatment could be wireless (Wi-Fi) connected STBs, health monitoring equipment, or other client devices. An operator may desire to prioritize certain clients at the expense of other clients. For example, a Wi-Fi connected STB may need priority over other high-speed data (HSD) clients to ensure timely delivery of video packets.

In embodiments, an operator can identify favored clients and characterize their level of service. For example, a management information base (MIB) and/or TR-69 object can be used in identifying favored clients or characterizing a level of service. A MIB and/or TR-69 object may also allow the operator to provide input on the desired behavior of a wireless (Wi-Fi) system when multiple service sets are to be treated differently.

In embodiments, some service flows may require favored treatment over other service flows. An example might be a computer that also acts as a media server for the consumer, wherein electronic mail or web traffic might not merit favored treatment, but if the user has purchased a service from the operator and is using the media server to receive the content, that high value flow may be deserving of special treatment. An end-user may choose to allow most video traffic to have a normal priority that may be affected by other network activity or by network degradation, but an operator may prioritize a high-value service, such as a pay-per-view event, to ensure that the performance of that flow is preserved over other traffic.

In embodiments, differentiated services code point (DSCP) markings may be used by an operator to indicate that some traffic needs certain quality of service (QoS) priority or latency treatment. A MIB table can provide a translation from expected incoming DSCP or other packet markings into priority classifications. A MIB table could be used by the operator to list specific clients that should be given priority, or the MIB could list client types (e.g., using the first 3 digits of a MAC address) to be given priority. The consumer might also be given access through a Web GUI to a prioritization tool that would allow the consumer to select which clients to be given priority treatment during congestion.

Figure 2:
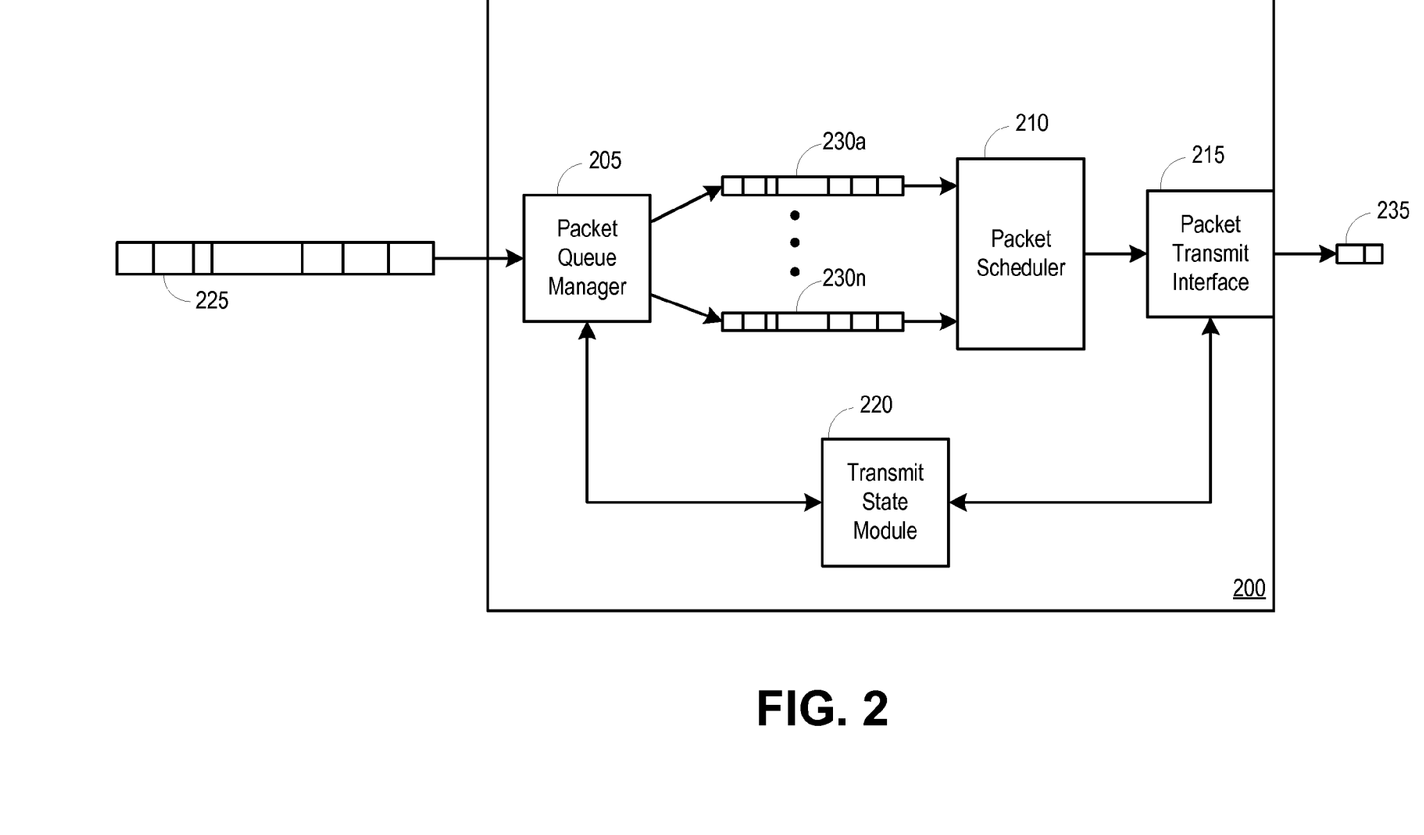
FIG. 2 is a block diagram illustrating an example component operable to facilitate the management of access point transmissions.

FIG. 2 is a block diagram illustrating an example component 200 operable to facilitate the management of access point transmissions based upon priority of traffic. The component 200 can include a packet queue manager 205, a packet scheduler 210, a packet transmit interface 215, and a transmit state module 220. In embodiments, the component 200 may be within an access point 105 of FIG. 1.

In embodiments, the component 200 can receive a packet stream 225 at the packet queue manager 205. The packet stream 225 may be received through a connection to the subscriber network 115 of FIG. 1 and may include a plurality of packets associated with various and different pieces of content, end-users, and/or target devices. The packet queue manager can identify a piece of content, end-user, and/or target device associated with each packet within the packet stream 225 and can place each packet within a packet queue 230a-n that is designated for packets of the same content, end-user, and/or target device. For example, the packet queue manager may identify a piece of content, end-user, and/or target device based upon identifiers carried within a packet header. The packet queue manager 205 may classify packets per client and/or per service type, and may manage the packet queues in times of network congestion.

In embodiments, the packet scheduler 210 may schedule the output of packets within the one or more packet queues 230a-n. The packet scheduler 210 can make the determination from which packet queue 230a-n to select a packet based upon various factors (e.g., congestion of wireless link, packet latency requirements, queue depth, priority status, etc.). For example, packets within a packet queue 230a-n may be marked for priority treatment, and the packet scheduler 210 can schedule transmissions of packets within the prioritized packet queue such that packets from the prioritized queue are output at a faster rate than packets from other queues. The packet scheduler 210 may take packets from the packet queues 230a-n in a controlled manner to allow the enforcement of various policies including device priority, flow priority or other prioritization schemes.

In embodiments, the packet transmit interface 215 can control the output of downstream packets from the component 200. The packet transmit interface 215 may output downstream packets to one or more devices (e.g., stations 110 of FIG. 1) through various network interfaces, such as a wireless link. The packet transmit interface 215 may output downstream packets during transmission opportunities, and transmission opportunities can be contended for according to the priority of packets in the packet queues 230a-n and associated backoff settings. After a packet is output through the packet transmit interface 215, the packet transmit interface can enter into a backoff period. The backoff period may be a predetermined and/or varying period of time during which the packet transmit interface 215 refrains from contending for a transmission opportunity. In embodiments, backoff periods may be configured such that a shorter backoff period is used when there are high priority packets (e.g., live video packets) in the packet queues 230a-n, and a longer backoff period is used when there are no high priority packets in the packet queues 230a-n.

In embodiments, downstream transmission time by the packet transmit interface 215 can be allocated between aggressive phases and background phases, during which aggressive transmission attempts and background transmission attempts are made respectively. During an aggressive phase, the packet transmit interface 215 can use high priority (e.g., 'Video') contention parameters which permit the packet transmit interface 215 to use a short backoff duration after a transmission. During a background phase, the packet transmit interface 215 may use lower-priority (e.g., 'Background') contention parameters. During the background phase, the packet transmit interface 215 can use a longer backoff duration after a transmission.

In embodiments, the transmit state module 220 may control whether the packet transmit interface 215 operates under an aggressive phase or a background phase. The determination whether to operate under an aggressive phase or background phase may be based on one or more of various factors. For example, the phase determination can be based on the priority of packets within the packet queues 230a-n, the level of congestion on a link through which packets from the packet queues 230a-n are transmitted, the depth of packet queues 230a-n, and others. The transmit state module 220 may communicate with the packet queue manager 205 and packet transmit interface to determine such factors as packet priority, queue health, and network congestion.

Figure 3:
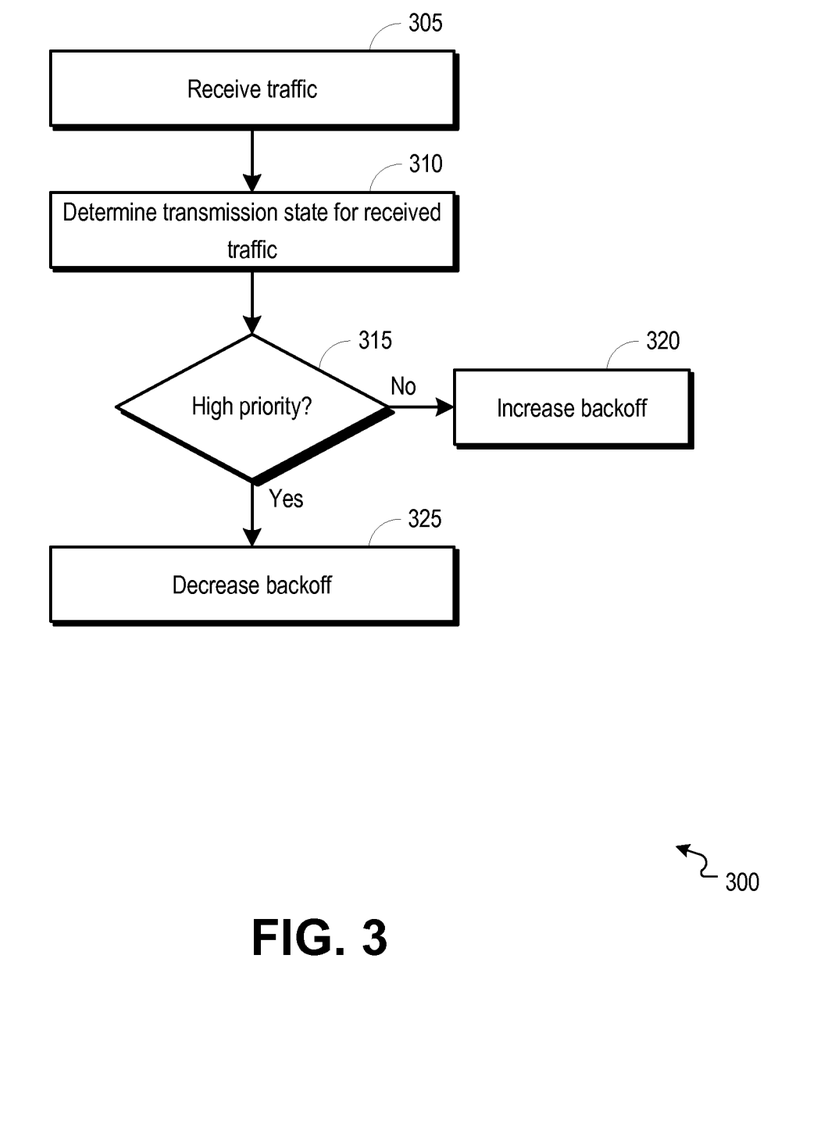
FIG. 3 is a flowchart illustrating an example process operable to facilitate the management of access point transmissions.

FIG. 3 is a flowchart illustrating an example process 300 operable to facilitate the management of access point transmissions based upon priority of traffic. The process 300 can begin at 305, when downstream traffic is received at an access point (e.g., access point 105 of FIG. 1). Downstream traffic may be received by an access point as one or more packet streams, and the received packets may be enqueued at one or more packet queues (e.g., packet queues 230a-n of FIG. 2).

At 310, a determination can be made as to a priority level of treatment for transmitting the received traffic. For example, the level of treatment can be based upon a priority classification associated with received packets, depth of packet queues at the access point, congestion of a link used for delivery of services from the access point to one or more stations, and other service requirements such as maximum latency.

At 315, a determination can be made whether packets queued at the access point require high priority transmission contention by the access point. Where high priority packets are queued at the access point, or where a service requires high packet throughput or low latency, the determination can be made that the transmission contention method at the access point should be set at a high priority level. Otherwise, the transmission contention method at the access point can be set at a lower priority level, such as a background level.

If at 315, the determination is made that packets queued at the access point do not require high priority treatment, the process 300 can proceed to 320. At 320, the access point can enter or remain in a background phase, and the backoff duration used for transmitting downstream communications from the access point can be increased.

If at 315, the determination is made that packets queued at the access point require high priority treatment, the process 300 can proceed to 325. At 325, the access point can enter or remain in an aggressive phase, and the backoff duration used for transmitting downstream communications from the access point can be decreased.

Figure 4:
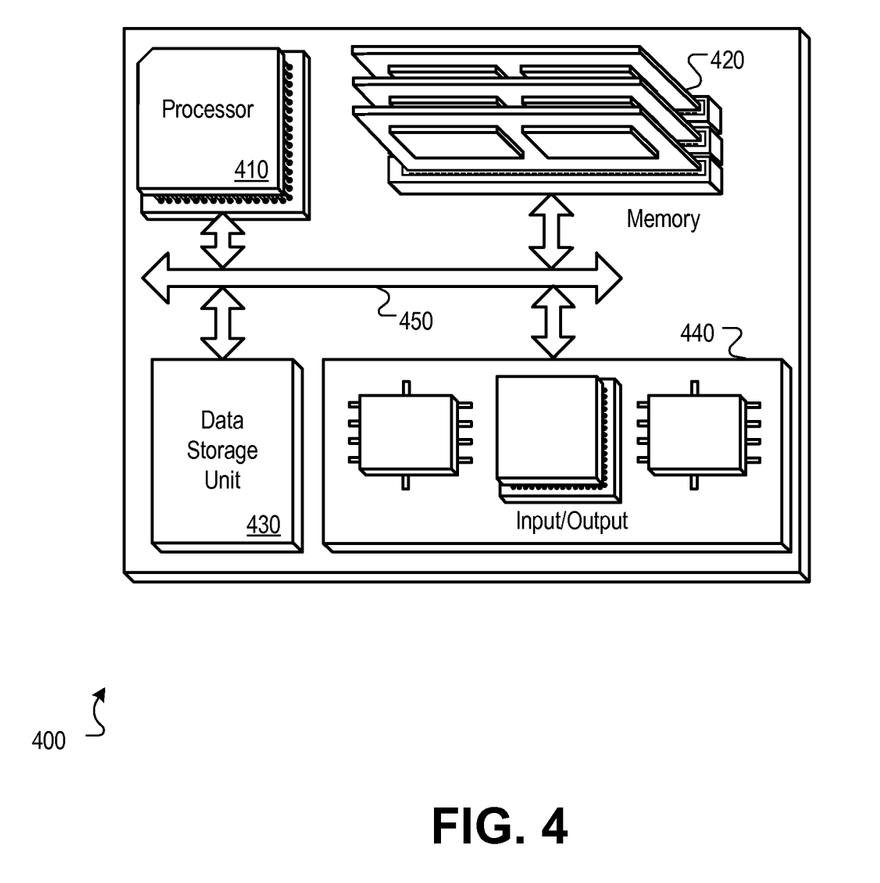
FIG. 4 is a block diagram of a hardware configuration operable to facilitate the management of access point transmissions.

FIG. 4 is a block diagram of a hardware configuration 400 operable to facilitate the management of access point transmissions based upon priority of traffic. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a station 110 of FIG. 1 (e.g., STB, television, computer, tablet, mobile device, etc.). In embodiments, the input/output device can include driver devices configured to send communications to, and receive communications from one or more networks (e.g., LAN, WLAN, subscriber network 115 of FIG. 1, etc.).

Those skilled in the art will appreciate that the invention improves upon methods and systems for controlling downstream and upstream communications that are handled by an access point. Methods, systems, and computer readable media can be operable to facilitate the management of access point transmissions based upon priority of traffic. An access point may periodically cycle between aggressive phases, during which the access point contends for downstream transmission opportunities aggressively, and background phases, during which the access point contends for downstream transmission opportunities passively. The access point may alternate between aggressive and background phases based upon a priority level of received packets, services, and/or clients. The access point may also alternate between aggressive and background phases based upon the congestion level and/or health of an associated network.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method, comprising:
   receiving one or more packets at an access point;
   determining a priority level with which to treat the received one or more packets;
   determining a backoff duration setting associated with the priority level, wherein the backoff duration setting is associated with a backoff duration that controls the amount of time for which the access point must wait between outputting a successful downstream packet transmission along a communication link and making an attempt to output a subsequent downstream transmission along the communication link, and wherein determining the backoff duration setting comprises:
      if the priority level with which to treat the received one or more packets is determined to be less than a threshold level, the backoff duration setting associated with the priority level may be a background setting, wherein the background setting dictates a first backoff duration; and
      if the priority level with which to treat the received one or more packets is determined to be greater than a threshold level, the backoff duration setting associated with the priority level may be an aggressive setting, wherein the aggressive setting dictates a second backoff duration, the second backoff duration being less than the first backoff duration;
   applying the backoff duration setting to transmission opportunity contention parameters associated with the access point; and
   outputting one or more of the received packets according to the backoff duration setting.

2. The method of claim 1, wherein the priority level with which to treat the received one or more packets is determined based upon one or more characteristics associated with one or more of the received packets.

3. The method of claim 1, wherein the priority level with which to treat the received one or more packets is determined based upon the health status of the communication link.

4. The method of claim 1, wherein the priority level with which to treat the received one or more packets is determined based upon the number of packets queued at one or more queues associated with the access point.

5. The method of claim 1, wherein one or more of the received packets are targeted at one or more stations, and the priority level with which to treat the one or more packets is determined based upon a priority level associated with the one or more stations.

6. The method of claim 1, wherein the determination is made to treat the received one or more packets with a high priority level, and the backoff duration setting associated with the high priority level is a short backoff duration setting.

7. The method of claim 1, wherein the determination is made to treat the received one or more packets with a low priority level, and the backoff duration setting associated with the low priority level is a long backoff duration setting.

8. A system, comprising:
   an interface configured to be used to receive one or more packets;
   one or more modules configured to:
      determine a priority level with which to treat the received one or more packets;
      determine a backoff duration setting associated with the priority level, wherein the backoff duration setting is associated with a backoff duration that controls the amount of time between outputting a successful downstream packet transmission along a communication link and making an attempt to output a subsequent downstream transmission along the communication link, and wherein determining the backoff duration setting comprises:
    if the priority level with which to treat the received one or more packets is determined to be less than a threshold level, the backoff duration setting associated with the priority level may be a background setting, wherein the background setting dictates a first backoff duration; and
    if the priority level with which to treat the received one or more packets is determined to be greater than a threshold level, the backoff duration setting associated with the priority level may be an aggressive setting, wherein the aggressive setting dictates a second backoff duration, the second backoff duration being less than the first backoff duration;
  apply the backoff duration setting to transmission opportunity contention parameters; and
an interface configured to be used to output one or more of the received packets according to the backoff duration setting.

9. The system of claim 8, wherein the priority level with which to treat the received one or more packets is determined based upon one or more characteristics associated with one or more of the received packets.

10. The system of claim 8, wherein the priority level with which to treat the received one or more packets is determined based upon the health status of the communication link.

11. The system of claim 8, wherein one or more of the received packets are targeted at one or more stations, and the priority level with which to treat the one or more packets is determined based upon a priority level associated with the one or more stations.

12. The system of claim 8, wherein the determination is made to treat the received one or more packets with a high priority level, and the backoff duration setting associated with the high priority level is a short backoff duration setting.

13. The system of claim 8, wherein the determination is made to treat the received one or more packets with a low priority level, and the backoff duration setting associated with the low priority level is a long backoff duration setting.

14. One or more non-transitory computer readable media having instructions operable to cause one or more processors to perform the operations comprising:
  receiving one or more packets at an access point;
  determining a priority level with which to treat the received one or more packets;
  determining a backoff duration setting associated with the priority level, wherein the backoff duration setting is associated with a backoff duration that controls the amount of time for which the access point must wait between outputting a successful downstream packet transmission along a communication link and making an attempt to output a subsequent downstream transmission along the communication link, and wherein determining the backoff duration setting comprises:
    if the priority level with which to treat the received one or more packets is determined to be less than a threshold level, the backoff duration setting associated with the priority level may be a background setting, wherein the background setting dictates a first backoff duration; and
    if the priority level with which to treat the received one or more packets is determined to be greater than a threshold level, the backoff duration setting associated with the priority level may be an aggressive setting, wherein the aggressive setting dictates a second backoff duration, the second backoff duration being less than the first backoff duration;
  applying the backoff duration setting to transmission opportunity contention parameters associated with the access point; and
  outputting one or more of the received packets according to the backoff duration setting.

15. The one or more non-transitory computer readable media of claim 14, wherein the priority level with which to treat the received one or more packets is determined based upon one or more characteristics associated with one or more of the received packets.

16. The one or more non-transitory computer readable media of claim 14, wherein the priority level with which to treat the received one or more packets is determined based upon the health status of the communication link.

17. The one or more non-transitory computer readable media of claim 14, wherein the priority level with which to treat the received one or more packets is determined based upon the number of packets queued at one or more queues associated with the access point.

18. The one or more non-transitory computer readable media of claim 14, wherein one or more of the received packets are targeted at one or more stations, and the priority level with which to treat the one or more packets is determined based upon a priority level associated with the one or more stations.

19. The one or more non-transitory computer readable media of claim 14, wherein the determination is made to treat the received one or more packets with a high priority level, and the backoff duration setting associated with the high priority level is a short backoff duration setting.

20. The one or more non-transitory computer readable media of claim 14, wherein the determination is made to treat the received one or more packets with a low priority level, and the backoff duration setting associated with the low priority level is a long backoff duration setting.

* * * * *